United States Patent [19]

McBeath et al.

[11] Patent Number: 4,779,132

[45] Date of Patent: Oct. 18, 1988

[54] VIDEO MONITOR USING ENCODED SYNC SIGNALS

[75] Inventors: Les L. McBeath, Elmhurst; Amir M. Sheikholeslami, Arlington Heights; Glenn T. Turro, Oak Park, all of Ill.

[73] Assignee: Zenith Electronics Corporation, Glenview, Ill.

[21] Appl. No.: 70,999

[22] Filed: Jul. 8, 1987

[51] Int. Cl.[4] .......... H04N 5/04

[52] U.S. Cl. .......... 358/148; 358/150; 340/814

[58] Field of Search .......... 358/148, 150, 147, 146, 358/153, 158; 364/521; 340/814, 703

[56] References Cited

U.S. PATENT DOCUMENTS 4,583,119 4/1986 Roscoe .......... 358/148

4,727,362 2/1988 Rackley et al. .......... 340/703

FOREIGN PATENT DOCUMENTS 0004798 10/1979 European Pat. Off. .

2162026 1/1986 United Kingdom .......... 340/814

*Primary Examiner*—James J. Groody

*Assistant Examiner*—David E. Harvey

[57] ABSTRACT

A video terminal is capable of operating with three different vertical formats which are determined by the polarities of the incoming horizontal and vertical sync signals. A PROM is supplied with address inputs corresponding to the different combinations of incoming vertical and horizontal sync signal polarities and signal levels, and outputs comprising mode selection signals and horizontal and vertical sync pulses of given polarity for use by the monitor.

4 Claims, 2 Drawing Sheets

| ADDRESS | | | | MODE BITS | | | SYNC NORMALIZATION BITS | | |
|---|---|---|---|---|---|---|---|---|---|
| A0 | A1 | A2 | A3 | V1 | V2 | V3 | V SYNC | H SYNC | |
| 0 | 0 | 0 | 0 | 1 | 0 | 0 | 1 | 1 | M0 |
| 0 | 0 | 1 | 0 | 1 | 0 | 0 | 1 | 0 | M1 |
| 1 | 0 | 0 | 0 | 1 | 0 | 0 | 0 | 1 | M2 |
| 1 | 0 | 1 | 0 | 1 | 0 | 0 | 0 | 0 | M3 |
| 0 | 0 | 0 | 1 | 0 | 1 | 0 | 1 | 0 | M4 |
| 0 | 0 | 1 | 1 | 0 | 1 | 0 | 1 | 1 | M5 |
| 1 | 0 | 0 | 1 | 0 | 1 | 0 | 0 | 0 | M6 |
| 1 | 0 | 1 | 1 | 0 | 1 | 0 | 0 | 1 | M7 |
| 0 | 1 | 0 | 0 | 0 | 0 | 1 | 0 | 1 | M8 |
| 0 | 1 | 1 | 0 | 0 | 0 | 1 | 0 | 0 | M9 |
| 1 | 1 | 0 | 0 | 0 | 0 | 1 | 1 | 1 | M10 |
| 1 | 1 | 1 | 0 | 0 | 0 | 1 | 1 | 0 | M11 |

FIG. 2

VIDEO MONITOR USING ENCODED SYNC SIGNALS

BACKGROUND OF THE INVENTION AND PRIOR ART

This invention relates generally to video monitors and particularly to video monitors that are capable of operation in a plurality of modes.

The use of video monitors has grown rapidly with the proliferation of computer terminals. Those monitors of greatest interest to this invention are so-called high resolution monitors that are used for the display of data. Monitors generally have a non-standard display format (as compared with television cathode ray tube displays) and often utilize different horizontal and vertical scanning frequencies. The availability of different data output formats from computers and different color graphics boards for use in monitors present a problem to manufacturers. Since the various formats and graphics boards may entail the use of different horizontal frequencies and vertical resolutions, monitor manufacturers who wish to supply equipment that is operable with a wide range of computer terminals must provide suitable accommodation means.

In particular, a monitor system that is capable of displaying information with a single horizontal frequency of 31.5 KHz and any of three different vertical formats (resolutions) has been announced. The three vertical formats are 350 lines, 400 lines and 480 lines. The particular format used is encoded by the polarity of the incoming horizontal and vertical sync signals.

This situation challenges a manufacturer who wants to market a single video monitor that is capable of operation with input data formatted in any of the different modes. Clearly, separate deflection and sync signal processing circuits, i.e., ones that are individually tailored to a particular piece of equipment, impose heavy inventory and cost burdens. The present invention solution utilizes a PROM (programmable read only memory) that has a plurality of input signal-accessible memory locations, at each of which output data is stored, for providing mode signals based upon the polarities of the incoming sync signals and the correct polarity sync signals for use by the monitor apparatus. While in the preferred embodiment, a PROM is utilized, it will be readily apparent that any type memory means ma be substituted.

OBJECTS OF THE INVENTION

A principal object of the invention is to provide a novel video monitor.

Another object of the invention is to provide a video monitor that is automatically changeable for operation in different modes.

BRIEF DESCRIPTION OF THE DRAWINGS

These and other objects and advantages of the invention will be apparent upon reading the following description in conjunction with the drawings, in which:

FIG. 2 shows programming of the PROM used in the invention.

DESCRIPTION OF THE PREFERRED EMBODIMENT

Figure 1:
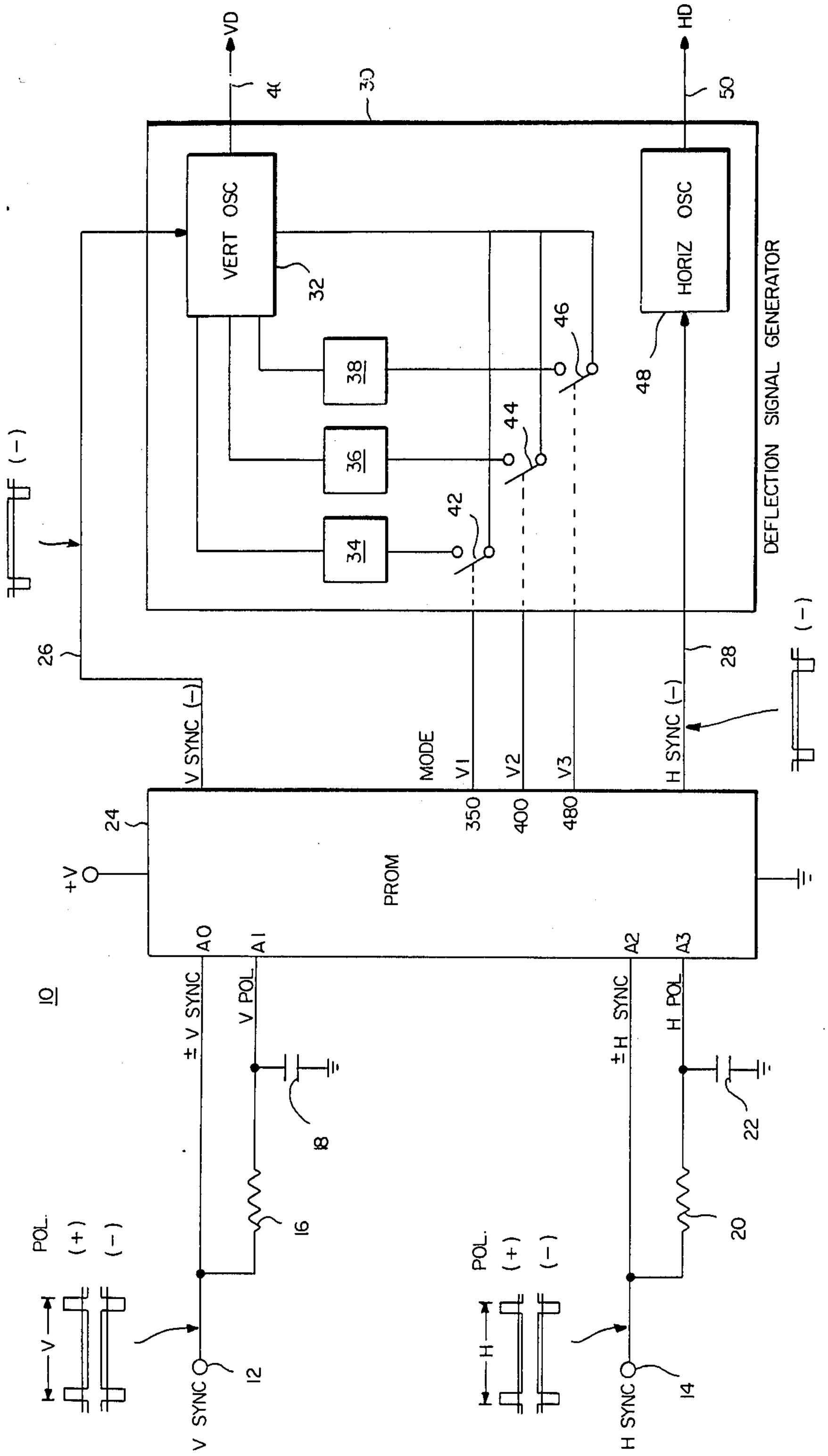
FIG. 1 comprises a partial block, partial schematic diagram of a video monitor constructed in accordance with the invention.

Referring to FIG. 1 of the drawings, a video monitor utilizing the present invention is generally designated by reference numeral 10. As is readily apparent, only a portion of the video monitor is shown, namely, the sync signal inputs, the PROM for decoding the sync signal inputs into appropriate mode selection signal outputs and sync pulses of the proper polarity, and the deflection oscillator circuits. Structure involved with video data translation, deflection signal development and the cathode ray tube display and drive circuitry are eliminated for the sake of clarity. A pair of input terminals 12 and 14, for receiving incoming vertical and horizontal sync signals, respectively, are provided on the monitor. Terminal 12 is connected directly to the A0 address input of a PROM 24 and terminal 14 is connected directly to the A2 address input of PROM 24. The A0 and A2 address input lines are identified with the legends ±V sync and ±H sync, respectively, indicating that incoming horizontal and vertical sync signals may be of either positive or negative-going polarity. A first integrating network, consisting of a resistor 16 and a capacitor 18, is connected to terminal 12 for supplying the A1 address input of PROM 24. A second integrating network, consisting of a resistor 20 and a capacitor 22, is connected to terminal 14 and supplies the A3 address input of PROM 24. As previously mentioned, and as indicated by the waveforms adjacent the respective terminals, the incoming horizontal and vertical sync signals can be characterized by either positive or negative-going polarities. The signal polarity is conveniently determined by the relative voltage level developed when the signal is integrated.

The polarity of either the vertical or horizontal sync signal should be distinguished from the instantaneous TTL level of the signal (0–5 V). Thus, address terminal A1 of PROM 24 receives a signal that is indicative of the polarity of the incoming vertical sync signal and address terminal A3 receives a signal that is indicative of the polarity of the incoming horizontal sync signal. The ±V sync and ±H sync signals applied to address terminals A0 and A2, respectively, represent the instantaneous levels of the synchronizing signals which can be of either polarity. The four address inputs A0–A3 can address 16 different memory locations of PROM 24. Only 12 of the locations are needed with the three vertical format system used (corresponding to vertical formats of 350, 400 and 480 lines). At each of the memory locations, a 5-bit word is stored with three of the bits being determinative of the mode selected and two of the bits being used to normalize the polarities of the horizontal and vertical sync pulses as required by the monitor.

The outputs of PROM 24 comprise V1, V2 and V3 mode selection lines, a normalized vertical sync pulse line 26 and a normalized horizontal sync pulse line 28. These are all supplied to a deflection signal generator 30 which includes a vertical oscillator 32 and a horizontal oscillator 48, both oscillators being designed for operation in response to given polarity sync pulses. Oscillators 32 and 48 provide vertical deflection signals on a line 40 and horizontal deflection signals on a line 50, respectively, to deflection systems VD and HD (not shown). The three mode lines are coupled to three switches 42, 44 and 46 which act to place appropriate means 34, 36 and 38 in circuit with vertical oscillator 32 for changing its signal output and frequency characteristics to produce the 350, 400 and 480 vertical line operating modes. The normalized vertical sync line 26 is connected to vertical oscillator 32 and the normalized horizontal sync line 28 is connected to horizontal oscillator 48.

As indicated on PROM 24, mode line V1 represents the 350 vertical line operating mode, mode line V2 represents the 400 vertical line operating mode and mode line V3 represents the 480 vertical line operating mode. In general, the different modes are obtained by adjusting the frequency of the vertical oscillator and/or changing the vertical size of the display. The change in vertical size may be accompanied by a change in vertical pincushion correction, a variation in brightness limiting setting and the like, all in accordance with well-known standard practices in video monitors capable of operating in different modes. As those skilled in the art will readily recognize, the frequency of the horizontal oscillator for differing formats could also be similarly changed if the format demanded it.

The polarities of the incoming horizontal and vertical sync signals are used to determine the mode. Consequently, for a given horizontal and vertical sync polarity, only one of the mode lines V1, V2 and V3 will be activated to actuate the appropriate one of switches 42, 44 and 46. Thus, a given group of memory locations will be accessed based upon the combination of polarities of the incoming sync signals in accordance with the integrated signal levels applied to PROM address terminals A1 and A3. Within the sync signal polarity constraints, both the horizontal and the vertical sync signals will instantaneously go high and low at TTL signal levels. The high and low levels of the incoming sync signals result in accessing different memory locations within a given group. For each combination of horizontal and vertical sync signal levels (at any particular time), one memory location of the group is addressed. At that memory location, three stored information bits are devoted to determining V1, V2 and V3. These bits will be seen to be the same for any given combination of incoming horizontal and vertical sync signal polarities since the operating mode will be the same. Information representing the normalized horizontal and vertical sync pulses comprise the other two bits which will always yield the same output sync pulse polarity since deflection system 30 requires a given polarity of sync pulses. Thus, irrespective of the incoming sync signal polarities, the output polarities of the sync pulses must be proper for the monitor.

FIG. 2 represents an exemplary illustration of the manner in which PROM 24 may be programmed. In this illustration a logic "1" bit represents an integrated sync signal having a negative-going polarity and a logic "0" bit represents an integrated sync signal having a positive-going polarity. Also, it is assumed that both oscillators 32 and 48 are designed for operation in response to negative-going vertical and horizontal sync signals, respectively.

The memory is divided into three groups of memory locations, M0–M3, M4–M7 and M8–M11 as indicated by the heavy lines. Each of memory locations M0–M11 comprises five bits; three mode bits and two sync normalization bits. When both address inputs A1 and A3 are logic "0" (representing positive-going polarity input vertical and horizontal sync signals), one of the four memory locations of the first group M0–M3 of PROM 24 is addressed. Each of the memory locations in the first group includes a logic "1" V1 output and logic "0" V2 and V3 outputs. As a result, the V1 (350 line) mode of operation is selected regardless of which of the memory locations in the first group is addressed. As previously mentioned, the instantaneous levels of the vertical and horizontal sync signals applied to the A0 and A2 address inputs of PROM 24 may be either high (logic "1") or low (logic "0") at any given time. Memory location M0 is addressed which A0 and A2 are both logic "0"; memory location M1 is addressed when A0 is logic "0" and A2 is logic "1"; memory location M2 is addressed when A0 is logic "1" and A2 is logic "0"; and memory location M3 is addressed when both A0 and A2 are logic "1". Thus, while remaining in the V1 mode, different ones of memory locations M0–M3 will be addressed as the instantaneous levels of the input sync signals change between their four possible combinations.

It will be recalled that both oscillators 32 and 48 are designed to operate in response to sync signals having negative-going polarities. However, in the V1 mode, both input sync signals have positive-going polarities (A1 and A3 are both logic "0"). The sync normalization bits stored in memory locations M0–M3 are accordingly selected to invert both input sync signals to provide negative-going polarity sync pulses on outputs 26 and 28 (FIG. 1). Thus, if at any instant both input sync signals are low (logic "0"), the sync normalization bits of addressed memory location M0 provides high (logic "1") outputs on lines 26 and 28. It will be seen that the sync normalization bits of the remaining memory locations M1–M3 similarly serve to invert the incoming positive-going sync signals to negative-going output pulses. Thus, memory locations M0–M3 serve to select the V1 mode of operation based on the polarity of both input sync signals being positive-going and simultaneously invert both input sync signals to provide negative-going sync pulses for operating oscillators 32 and 48.

In like manner, the second group of memory locations M4–M7 select the V2 mode of operation based upon the input vertical sync signal having a positive-going polarity (A1="0") and the input horizontal sync signal having a negative-going polarity (A3="1"). At the same time, the sync normalization bits invert the vertical sync signal but not the horizontal since it is already negative-going. Finally, memory locations M8–M11 select the V3 mode of operation based on the input vertical sync signal having a negative-going polarity (A1="1") and the input horizontal sync signal having a positive-going polarity (A3="0"). In this case, the sync normalization bits invert the horizontal sync signal but not the vertical sync signal since it is already negative-going.

It will be appreciated that the PROM may be replaceable so that a customer is readily able to adapt his monitor for use with any combination of operating mode selection by means of the polarity of either or both of the sync signals. It is a relatively simple matter to program another PROM for a special application. It will also be appreciated that selection of the different vertical formats is arbitrary and the invention is not limited thereto. Any operating mode of the monitor may be determined by appropriate manipulation of the polarities of either or both of the incoming horizontal and vertical sync signals. It will also further be appreciated that the PROM is merely the preferred embodiment of the invention and that other memory means may also be utilized for storing the required output data that corresponds to the input data. Accordingly, the invention is to be limited only as defined in the claims.

What is claimed is:

1. A video display terminal having a plurality of operating modes including:

input terminals for receiving incoming horizontal and vertical sync signals with the polarity of at least one of the incoming horizontal and vertical sync signals being coded and indicating a selected one of said operating modes;

mode selection means for selectively operating said terminal in said different operating modes;

deflection means for generating horizontal and vertical deflection signals; and memory means comprising a PROM having a plurality of memory locations addressed by different level and polarity combinations of said incoming horizontal and vertical sync signals and a plurality of outputs which provide mode selection signals for said mode selection means and provide horizontal and vertical sync pulses of given polarity for said deflection means in response to said incoming horizontal and vertical sync signals.

2. The terminal of claim 1 wherein said plurality of operating modes comprise three differing vertical formats.

3. A video display terminal having a plurality of vertical formats including:

input terminals for receiving incoming horizontal and vertical sync signals with the polarities of the incoming horizontal and vertical sync signals being coded and indicating a selected one of said vertical formats;

mode selection means for selectively operating said terminal in said different vertical formats;

deflection means for generating horizontal and vertical deflection signals;

memory means for producing mode selection signals for said mode selection means and for producing horizontal and vertical sync pulse of given polarity for said deflection means in response to said incoming horizontal and vertical sync signals; and said memory means including a PROM having a plurality of memory locations addressed by different level and polarity combinations of said incoming horizontal and vertical sync signals and a plurality of outputs providing said horizontal and vertical sync pulses of given polarity and said mode selection signals.

4. A video display terminal having a plurality of operating modes including:

input terminals for receiving incoming horizontal and vertical sync signals whose polarities are coded for indicating a selected one of said operating modes;

mode selection means for selectively operating said terminal in said different operating modes;

deflection means responsive to vertical and horizontal sync signals of given polarities for generating respective vertical and horizontal deflection signals;

memory means comprising a plurality of groups of multibit memory locations, the memory locations of each respective group having a plurality of common mode selection bits corresponding to one of said operating modes and a plurality of different sync normalization bits for translating said incoming vertical and horizontal sync signals to said given polarities;

address means for selecting one of said groups in response to the polarities of said incoming vertical and horizontal sync signals and for addressing a memory location within the selected group in response to the instantaneous levels of said incoming vertical and horizontal sync signals; and means for applying the mode selection bits and the sync normalization bits of said addressed memory location to said mode selection means and to said deflection means, respectively.

* * * * *